(12) United States Patent
Yoshida et al.

(10) Patent No.: US 6,197,708 B1
(45) Date of Patent: Mar. 6, 2001

(54) DUST-REMOVING SYNTHETIC RESIN FILTER

(75) Inventors: Hideto Yoshida, Higashihiroshima; Tomoyuki Imai; Yasuhiko Fujii, both of Hiroshima; Masayuki Okamoto, Fujisawa; Takahiro Imano, Hiratsuka, all of (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/195,445

(22) Filed: Nov. 18, 1998

(30) Foreign Application Priority Data

Nov. 19, 1997 (JP) .................................................. 9-333734

(51) Int. Cl.[7] ...................................................... B32B 5/16
(52) U.S. Cl. ........................ 442/164; 442/381; 442/417; 422/177
(58) Field of Search ........................... 422/177; 442/164, 442/381, 417

(56) References Cited

U.S. PATENT DOCUMENTS

| 5,212,131 | * | 5/1993 | Belding ................................ 502/60 |
| 5,525,706 | * | 6/1996 | Gruber et al. ......................... 528/354 |
| 5,580,647 | * | 12/1996 | Larson et al. ......................... 428/245 |

OTHER PUBLICATIONS

Patent Abstracts of Japan, vol. 001, No. 027 (C–008), Mar. 28, 1977 & JP 51 140872 A, Dec. 4, 1996 (abstract).
Patent Abstracts of Japan, vol. 005, No. 200 (C–084), Dec. 18, 1981 & JP 56 122894 A, Sep. 26, 1981 (abstract).

* cited by examiner

*Primary Examiner*—Terrel Morris
*Assistant Examiner*—Jenna-Leigh Befumo
(74) *Attorney, Agent, or Firm*—Nixon & Vanderhye

(57) ABSTRACT

A dust-removing synthetic resin filter of the present invention comprises a filter material which comprises: synthetic resin fibers; and iron oxide particles having a catalytic activity to chlorine or hydrogen chloride gas. Such a dust-removing synthetic resin filter is capable of so-called clean combustion which is free from discharge of harmful substances upon incineration thereof and is advantageous from the standpoint of preventing environmental pollution.

8 Claims, 4 Drawing Sheets

0.1 μm 0.1 μm

DUST-REMOVING SYNTHETIC RESIN FILTER

BACKGROUND OF THE INVENTION

The present invention relates to a dust-removing synthetic resin filter for use in air conditioners or dust collectors, and more particularly, relates to a dust-removing synthetic resin filter capable of so-called clean combustion which is free from discharge of harmful substances upon incineration thereof, and is advantageous from the standpoint of preventing environmental pollution.

Dust-removing filters for use in air conditioners or dust collectors of buildings, factories or home (hereinafter referred simply to as "filter") have been periodically replaced with new ones at intervals of one to several years according to a degree of deterioration or contamination of the filters in order to maintain a good performance thereof.

Hitherto, since many of such filters are made of glass fibers, most of the used filters have been buried under the ground as wastes upon disposal thereof.

However, in association with the wide spread of air conditioners or the like, the amount of waste filters have been increased year by year, thereby causing problems concerning necessity of ensuring the space for waste disposal (landfill), occurrence of environmental pollution after the landfill or the like. For these reasons, there has been a recent tendency that the used filters are burned for disposal to reduce a volume thereof.

In consequence, it has been attempted to replace the glass fibers as a raw material of the filters with synthetic resin fibers made of polyesters or polypropylene. Incidentally, the filters comprising these synthetic resin fibers may contain glass fibers in an amount of not more than about 10% by weight in order to ensure a good dust-collecting efficiency (hereinafter referred to as "synthetic resin filter").

However, since these synthetic resin filters contain as a binder, acrylic resins or vinylidene chloride resin and further contain chloride compounds or the like in order to impart a fire retardant property to these filters, a large amount of hydrogen chloride gas or sulfur dioxide gas is generated upon burning thereof. Accordingly, it has been required to take a measure for treating such hydrogen chloride gas or sulfur dioxide gas, or there have been caused problems such as damage to incinerators due to a high-temperature combustion heat, corrosion of ducts or exhaust ventilating fans or the like.

On the other hand, it has also been attempted to recover energies generated upon the burning of the synthetic resin filters, and especially, studies on a so-called thermal recycle for converting such energies into an electric power, have proceeded.

In the thermal recycle, when hydrogen chloride is present in the combustion gas, the corrosion of steam-generating portions (heat exchangers or the like) has been caused.

For this reason, at present, there have been used a method of purifying the combustion gas to remove harmful substances therefrom (e.g., see Japanese Patent Application (KOKAI) No. 56-122894 (1981)).

More specifically, in Japanese Patent Application (KOKAI) No. 56-122894 (1981), there is described a method for recovering a fuel from waste plastics which comprises mixing waste plastics with a granulating material containing an alkaline calcium compound to reduce the volume of the waste plastics and solidify the waste plastics; subjecting the resultant solids to thermal decomposition; and neutralizing, fixing and removing hydrogen chloride generated upon the thermal decomposition by the above calcium compound.

The reaction for fixing the hydrogen chloride gas or the sulfur dioxide gas in the combustion gas by the calcium compound, proceeds is set forth below.

<Fixing reaction of hydrogen chloride gas>
Synthetic Resin+Heat→Hydrogen Chloride (HCl)+ Decomposition Gas (Combustible Gas)
$CaCO_3+2HCl→CaCl_2+H_2O+CO_2$
<Fixing reaction of sulfur dioxide gas>
Synthetic Resin+Heat→Combustion Gas+$SO_2$
$2SO_2+O_2→2SO_3$
$CaCO_3+SO_3→CaSO_4+CO_2$ The conversion rate of the hydrogen chloride into calcium chloride in the above-mentioned reaction is slower than the generation rate of the hydrogen chloride by decomposition of the synthetic resin, so that it is not possible to immediately fix the hydrogen chloride gas generated. In consequence, in Japanese Patent Application (KOKAI) No. 56-122894 (1981), it has been recommended that lime is used as a dehydrochlorinating agent in such an amount several times a stoichiometric amount thereof (Ca/2Cl=1).

However, in the case of producing the synthetic resin filter, it is disadvantageous that lime is present in the synthetic resin fibers or the filter material. Especially, when the lime is present in a large amount (enough to fix the hydrogen chloride gas generated), there arise problems such as a deteriorated filter efficiency, e.g., increase in pressure loss or deterioration in dust retention force; wear of fiber-producing apparatuses; deterioration in strength of fibers produced; increase in amount of ashes generated when used filters are burned; or the like.

Further, when an apparatus for purifying a combustion gas is to be connected to a steam generator in order to prevent the steam generator from being corroded in the thermal recycle, the temperature of the steam generator is lowered so that the energy recovery is limited to a low level. As a result, the conversion percentage of the recovered energy into an electric power is lowered, and it becomes difficult to accomplish the aim of the thermal recycle.

For these reasons, there has been studied a method of accelerating a reaction for the production of calcium chloride such that lime and hydrogen chloride can be reacted at such an increased reaction rate corresponding to the reaction rate of producing the hydrogen chloride by the decomposition of resin components, thereby enabling hydrogen chloride gas or sulfur dioxide gas generated upon burning of the synthetic resin to be immediately fixed by lime, etc., and preventing these gases from being scattered into an exhausted combustion gas. More specifically, there has been studied a catalyst for more rapidly transforming the hydrogen chloride gas generated into calcium chloride.

Among oxides of transition elements or the like, as catalysts capable of efficiently reacting hydrogen chloride gas generated in the course of heat-decomposition of the synthetic resin with dehydrochlorinating agents such as lime, there are known copper oxides or iron oxides. These oxides can absorb and activate the hydrogen chloride gas generated, and then serve for coupling the gas with the dehydrochlorinating agent such as lime. Therefore, these oxides can capture hydrogen chloride or sulfur dioxide with a high efficiency, and cause these gases to exist in the form of $CaCl_2$ or $CaSO_4$ in combustion ashes.

However, in the case where the copper oxides are burned for disposal, the oxides remain as ashes. Accordingly, in view of the toxicity, the use of the copper oxides is practically inappropriate.

As a result of the present inventors' earnest studies, it has been found that by using as a filter material, synthetic resin fibers having iron oxide particles having a high catalytic property for accelerating the fixing of hydrogen chloride gas, etc., the hydrogen chloride gas can be more rapidly fixed as calcium chloride and the sulfur dioxide gas can be more rapidly fixed as calcium sulfate. The present invention has been attained on the basis of the finding.

SUMMARY OF THE INVENTION

It is an object of the present invention to provide a dust-removing synthetic resin filter which can inhibit the generation of the hydrogen chloride gas or sulfur dioxide gas upon burning of the filter, thereby reducing the number of purifying facilities required for avoiding the environmental pollution due to the harmful gases, preventing the damage to incinerators or ancillary equipments thereof, and effectively recovering the combustion energy.

To accomplish the aim, in a first aspect of the present invention, there is provided a dust-removing synthetic resin filter comprising a filter material which comprises a synthetic resin fiber and iron oxide particles having a catalytic activity to chlorine or hydrogen chloride gas, which are attached or incorporated.

In a second aspect of the present invention, there is provided a dust-removing synthetic resin filter comprising a filter material which comprises synthetic resin fibers and iron oxide particles attached onto the surface of the synthetic resin fiber.

In a third aspect of the present invention, there is provided a dust-removing synthetic resin filter comprising a filter material which comprises synthetic resin fibers and iron oxide particles incorporated within the synthetic resin fiber.

In a fourth aspect of the present invention, there is provided a dust-removing synthetic resin filter comprising a filter material which comprises a filter sheet of synthetic resin fibers and iron oxide particles attached onto the surface of the filter sheet.

In a fifth aspect of the present invention, there is provided a dust-removing synthetic resin filter comprising a filter material comprising synthetic resin fibers and the iron oxide particles attached onto the surface of the synthetic resin fiber, and a pair of filter sheets of synthetic resin fibers sandwiching the filter material therebetween.

In a sixth aspect of the present invention, there is provided a dust-removing synthetic resin filter comprising a filter material comprising the synthetic resin fibers and iron oxide particles incorporated into the synthetic resin fiber, and a pair of filter sheets of synthetic resin fibers sandwiching the filter material therebetween.

In a seventh aspect of the present invention, there is provided a dust-removing synthetic resin filter comprising a filter material comprising a filter sheet of synthetic resin fibers and iron oxide particles attached onto the surface of the filter sheet, and a filter sheet of the synthetic resin fibers laminated on the surface of the iron oxide particles attached on the filter material.

DETAILED DESCRIPTION OF THE INVENTION

The synthetic resin filter according to the present invention may include (1) a synthetic resin filter comprising a filter material produced by attaching iron oxide particles onto the surface of a synthetic resin filter material composed of a synthetic resin fiber material, a laminated sheet of a synthetic resin fiber material or a woven sheet of a synthetic resin fiber material; or (2) a synthetic resin filter comprising a filter material composed of a synthetic resin fiber material which contains iron oxide particles or onto the surface of which iron oxide particles are attached.

The filter material of the synthetic resin fibers in the present invention may contain glass fibers in an amount of not more than about 10% by weight.

Further, the synthetic resin filter according to the present invention may include a synthetic resin filter having a multi-layered structure comprising the above-mentioned synthetic resin filter (1) or (2), and a filter sheet composed of a synthetic resin fiber material, the above-mentioned synthetic resin filter (1) or (2) being interposed between a pair of the filter sheets.

As the iron oxide particles usable in the present invention, there may be exemplified iron oxide hydroxide particles such as goethite ($\alpha$—FeOOH) particles or the like, hematite ($\alpha$—$Fe_2O_3$) particles, magnetite ($FeO_x \cdot Fe_2O_3$, $0 < x \leq 1$) particles, maghemite ($\gamma$—$Fe_2O_3$) particles, or the like. Among them, the goethite particles are preferred because of a high catalytic activity thereof. These particles may have a spindle shape or an acicular shape.

The properties of the iron oxide particles used in the present invention are as follows.

Figure 6:
FIG. 6 is an electron microscope photograph showing a shape of an iron oxide particle and a fine particle structure thereof.

That is, the iron oxide particles used in the present invention may be spindle-shaped particles. With respect to the particle size of the iron oxide particles used in the present invention, the major axis diameter thereof is usually 0.1 to 1.0 $\mu$m, preferably 0.1 to 0.6 $\mu$m, more preferably 0.2 to 0.4 $\mu$m, and the minor axis diameter thereof is usually 0.02 to 0.06 $\mu$m, preferably 0.02 to 0.05 $\mu$m, more preferably 0.03 to 0.04 $\mu$m. The aspect ratio (major axis diameter/minor axis diameter) thereof is usually 2:1 to 20:1, preferably 2:1 to 15:1, more preferably 2:1 to 10:1. The BET specific surface area of the iron oxide particles used in the present invention, is usually 20 to 200 $m^2/g$, preferably 60 to 150 $m^2/g$, more preferably 70 to 130 $m^2/g$. An example of the particle shape of the iron oxide particles used in the present invention, is a spindle shape as recognized from the electron microscope photograph shown in FIG. 6.

When the major axis diameter is more than 0.6 $\mu$m, the minor axis diameter is more than 0.05 $\mu$m or the BET specific surface area is less than 60 $m^2/g$, the catalytic activity of the iron oxide particles used is lowered, so that the hydrogen chloride gas cannot be sufficiently fixed and transformed into the calcium compound. On the other hand, when the major axis diameter is less than 0.1 $\mu$m, the minor axis diameter is less than 0.02 µm or the BET specific surface area is more than 150 m$^2$/g, the iron oxide particles become too fine, so that the workability thereof tends to be deteriorated.

The iron oxide particles used in the present invention may be produced by known methods (as described in Japanese Patent Application Laid-open (KOKAI) No. 4-59892, etc.). For example, the iron oxide particles may be produced by neutralizing iron sulfate in water using sodium carbonate.

The synthetic resin fibers used in the present invention may be produced from thermoplastic resins such as polyester resins, polypropylene resins, teflon resin, nylon resins, urethane resins, acrylic resins or the like.

As the binders used in the present invention, there may be exemplified acrylic resins, vinylidene chloride, urethane resins, vinyl chloride-vinyl acetate copolymer or the like.

The dispersants used in the present invention are not restricted to particular ones, and any known dispersants may be used therein. Examples of the dispersants may include cationic surfactants, anionic surfactants or the like.

The amount of the iron oxide particles used is usually 1 to 20 g based on 1 m$^2$ of a filter material made of the synthetic resin fiber, preferably 3 to 15 g per 1 m$^2$ of the filter material. It is preferred that the amount of the iron oxide particles used is 2.5 to 30 parts by weight based on 100 parts by weight of the filter material of the synthetic resin fibers.

In the rate-determining step of the fixing reaction of sulfur dioxide gas in combustion gas, the sulfur dioxide ($SO_2$) gas is extremely slowly oxidized into sulfuric anhydride (sulfur trioxide: $SO_3$), so that it becomes difficult to capture the sulfur dioxide gas in lime by conventional methods. On the other hand, iron oxide particles used in the present invention can remarkably increase the velocity of converting sulfur dioxide into sulfuric anhydride.

The synthetic resin filter according to the present invention may be produced by the following methods:

(i) Method of applying a liquid composition prepared by mixing iron oxide particles with a dispersant and a binder in water or an aqueous solution, to a synthetic resin fiber material by a spraying, coating or dipping process, thereby attaching the iron oxide particles onto the surface of the synthetic resin fiber material; forming the obtained synthetic fibers onto the surface of which the iron oxide particles is attached, into a filter material; and forming the thus-obtained filter material into a filter.

(ii) Method of applying a liquid composition prepared by mixing iron oxide particles with a dispersant and a binder in water or an aqueous solution, to a filter material made of synthetic resin fibers by a spraying or coating process, thereby attaching the iron oxide particles onto the surface of the filter material; and forming the obtained filter material onto the surface of which the iron oxide particles is attached, into a filter.

(iii) Method of preparing a synthetic resin fiber material by incorporating iron oxide particles into a molten resin; forming the obtained synthetic fiber material into which the iron oxide particles is incorporated, into a filter material; and forming the thus-obtained filter material into a filter.

(iv) Method of laminating a filter material of synthetic resin fiber on at least one surface of the filter produced in the above method (i), (ii) or (iii), thereby obtaining a multi-layered filter material; and forming the thus-obtained multi-layered filter material into a filter.

More specifically, iron oxide particles having an average major axis diameter of about 0.1 to about 0.6 µm, a dispersant and a binder are mixed in water or an aqueous solution of ethanol, methanol and/or ethyl acetate, to prepare a liquid composition. The thus-prepared liquid composition is applied on a synthetic resin fiber material or a filter material made therefrom by a spray-coating, coating or dipping process, thereby forming the synthetic resin fiber material or the filter material onto the surface of which the iron oxide particles is attached. The amount of the iron oxide particles is 2.5 to 30 parts by weight based on 100 parts of the synthetic resin fiber material or the filter material such that the iron oxide particles may be attached in an amount of 1 to 20 g based on 1 m$^2$ of the filter material. Alternatively, the iron oxide particles having an average major axis diameter of about 0.1 to about 0.6 µm may be kneaded and incorporated into a molten resin upon the production of the synthetic resin fiber material, i.e., at such a stage where a synthetic resin is melted and formed into fibers. The amount of the iron oxide particles is 2.5 to 30 parts by weight based on 100 parts of the synthetic resin fiber material such that the iron oxide particles may be incorporated in an amount of 1 to 20 g based on 1 m$^2$ of the filter material.

The synthetic resin filter according to the present invention is constituted by the thus obtained filter material onto the surface of which the iron oxide particles is attached, or which is produced from the synthetic resin fiber material onto the surface of which the iron oxide particles is attached or into which the iron oxide particles is incorporated.

Further, the synthetic resin filter according to the present invention may have such a multi-layered structure that the filter material onto the surface of which the iron oxide particles is attached, or which is produced from the synthetic resin fiber material onto the surface of which the iron oxide particles is attached or into which the iron oxide particles is incorporated, is sandwiched between separate filter material or laminated onto a separate filter material.

In this case, the multi-layered synthetic resin filter may be constituted by attaching two sheets of filter material having no iron oxide particles onto both the surfaces of the filter material onto the surface of which the iron oxide particles is attached, or which is produced from the synthetic resin fiber material onto the surface of which the iron oxide particles is attached or into which the iron oxide particles is incorporated; or by bonding two sheets of the filter material onto which the iron oxide particles is attached to each other.

The construction of the synthetic resin filter according to the present invention are concretely exemplified as follows.

(a) Synthetic resin filter comprises a filter material composed of the synthetic resin fibers, onto the surface of which the iron oxide particles are attached.

(b) Synthetic resin filter comprises a filter material comprising a laminated sheet composed of the synthetic resin fibers, onto the surface of which the iron oxide particles are attached.

(c) Synthetic resin filter comprises a filter material comprising a woven sheet composed of the synthetic resin fibers, onto the surface of which the iron oxide particles are attached.

(d) Synthetic resin filter comprises a filter material composed of the synthetic resin fibers onto the surface of which the iron oxide particles are attached.

(e) Synthetic resin filter comprises a filter material comprising a laminated sheet composed of the synthetic resin fibers onto the surface of which the iron oxide particles are attached.

(f) Synthetic resin filter comprises a filter material comprising a woven sheet composed of the synthetic resin fibers onto the surface of which the iron oxide particles are attached.

(g) Synthetic resin filter comprises a filter material composed of the synthetic resin fibers into which the iron oxide particles are attached.

(h) Synthetic resin filter comprises a filter material comprising a laminated sheet composed of the synthetic resin fibers into which the iron oxide particles are attached.

(i) Synthetic resin filter comprises a filter material comprising a woven sheet composed of the synthetic resin fibers into which the iron oxide particles are attached.

(j) Synthetic resin filter comprises a filter material composed of the synthetic resin filter (a), (b) or (c) and a synthetic resin filter material laminated on the surface of the iron oxide particles attached.

(k) Synthetic resin filter comprises a filter material composed of the synthetic resin filter (e), (f), (g), (h) or (i) and a pair of synthetic resin filter materials sandwiching the synthetic resin filter therebetween.

In the case where the thus-constituted synthetic resin filter is burned for disposal, the iron oxide particles can exhibit a catalytic effect for promoting combustion of the filter as described above. The catalytic effect of the iron oxide particles can ensure complete combustion of the synthetic resin filter even under conditions of low $O_2$ concentration and low temperature. As a result of the complete combustion of the synthetic resin filter, hydrogen chloride gas or sulfur dioxide gas is prevented from being generated in an incinerator. That is, since the iron oxide particles preliminarily attached or incorporated can exhibit the catalytic effect, the hydrogen chloride gas generated upon combustion of the synthetic resin can be rapidly converted into calcium chloride, and the sulfur dioxide gas can also be converted into sulfuric anhydride having an extremely high reactivity with calcium components such as lime or the like.

Figure 1:
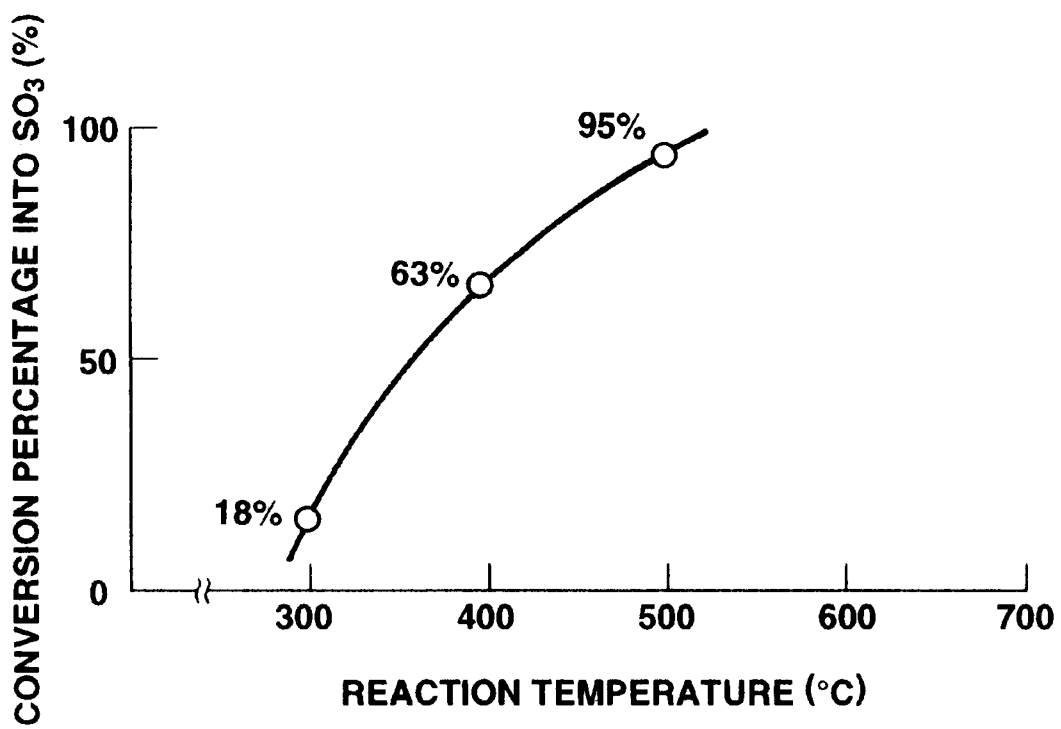
FIG. 1 is a graph showing a temperature characteristic of iron oxide particles used in the present invention.

With respect to the conversion reaction into sulfuric anhydride by the effect of the iron oxide particles, the temperature characteristic of iron oxide particles is shown in FIG. 1. In the conversion reaction, 20 ml of iron oxide particles (in the form of 3 mm$\phi$ pellets) is catalytically reacted with air containing $SO_2$ in an amount of 1000 ppm and supplied at 50 liters/h, thereby converting $SO_2$ into $SO_3$. As recognized from FIG. 1, when the reaction temperature is 500° C., the percentage of conversion of $SO_2$ into $SO_3$ is 95%.

The synthetic resin filter according to the present invention can be used as air filters for air conditioners, bag filters for dust collectors capable of treating air containing dusts at a high concentration or gas-treating filters. As the shape of the synthetic resin filter according to the present invention, there may be exemplified a folded shape, a bag shape, a roll shape, a panel shape, a cylindrical shape or the like.

In the synthetic resin filter according to the present invention, since the iron oxide particles attached thereto or incorporated thereinto act as a catalyst upon incineration of the used filters and make calcium or magnesium act as a dehydrochlorinating agent or a desulfurizing agent (agent for removing sulfur dioxide), the generation of hydrogen chloride gas or sulfur dioxide gas upon burning of the filter can be effectively prevented.

In addition, since the complete combustion is assured even in a low-temperature range, there can be obtained the effect for preventing incinerators or ancillary equipments thereof from being damaged.

Further, when the filter is burned for disposal, it is unnecessary to take any particular measure therefor because the above-mentioned catalytic effect can be exhibited only by burning the filters. Therefore, the synthetic resin filter according to the present invention can have a high industrial applicability.

EXAMPLES

The present invention will now be described in more detail with reference to the following example, but the present invention is not restricted to the example and various modifications are possible within the scope of the invention.

The particles according to the present invention were measured as follows.

The average particle size of iron oxide particles is expressed by an average of values measured on an electron microscope photograph, and the specific surface area thereof is expressed by a value measured by a BET method.

The particle shape of the iron oxide particles was observed by a scanning electron microscope (S-800: manufactured by HITACHI LIMITED).

Example 1

A 1 m$^2$ filter material for HEPA (High Efficiency Particulate Air-filter) prepared by weaving synthetic resin fibers (polyester resin), was immersed in an aqueous dispersion in which 3 g of iron oxide particles (particle shape: spindle; average major axis diameter: 0.3 $\mu$m; average minor axis diameter: 0.03 $\mu$m; BET specific surface area: 100 m$^2$/g) were dispersed in water together with a dispersant (cationic surfactant) and a binder (vinylidene chloride resin), and then dried, thereby obtaining a Sample 1 onto which the iron oxide particles were attached. The thus obtained Sample was cut into a size of 100 mm×100 mm. The cut sample was then burned in an electric furnace. Hydrogen chloride gas and sulfur dioxide gas generated upon the burning were introduced into a gas detecting tube, and analyzed.

Separately, a 1 m$^2$ filter material made of polyester resin for bag filter was immersed in an aqueous dispersion in which 5 g of iron oxide particles (particle shape: spindle; average major axis diameter: 0.3 $\mu$m; average minor axis diameter: 0.03 $\mu$m; BET specific surface area: 100 m$^2$/g) were dispersed in water together with a dispersant (cationic surfactant) and a binder (vinylidene chloride resin), and then dried, thereby obtaining a Sample 2 onto which the iron oxide particles were attached. The thus obtained Sample 2 was cut into a size of 20 mm×20 mm. The cut sample was then burned in an electric furnace in the same manner as in the Sample 1. Hydrogen chloride gas and sulfur dioxide gas generated upon the burning were introduced into a gas detecting tube, and analyzed.

Further, blank filters (as comparison) of the Samples 1 and 2 onto which no iron oxide particles was attached, were respectively burned in the same manner as above. Hydrogen chloride gas and sulfur dioxide gas generated upon the burning were introduced into a gas detecting tube, and analyzed. The results of the analysis were compared with those of the Samples 1 and 2.

Figure 2:
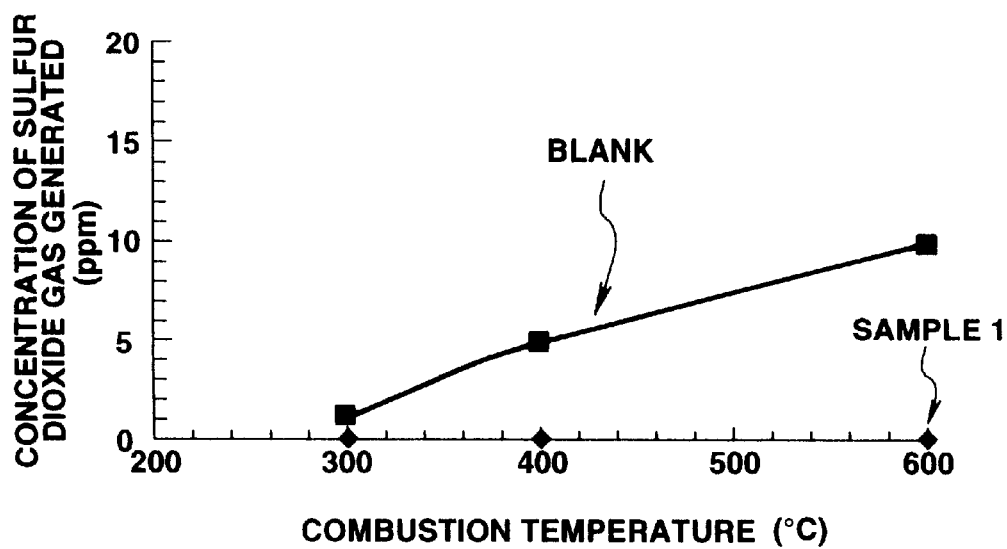
FIG. 2 is a graph showing sulfur dioxide gas concentration of using Sample 1 and blank thereof.

FIG. 2 shows results of the analysis of the sulfur dioxide gas concentrations from the Sample 1 and the blank thereof. As a result of the analysis, it was determined that when the combustion temperature exceeded 300° C., sulfur dioxide gas was generated from the blank burned. Whereas, it was also determined that when the Sample 1 was analyzed at combustion temperatures of 300° C., 400° C. and 600° C., no sulfur dioxide gas was generated from the Sample 1 burned.

Figure 3:
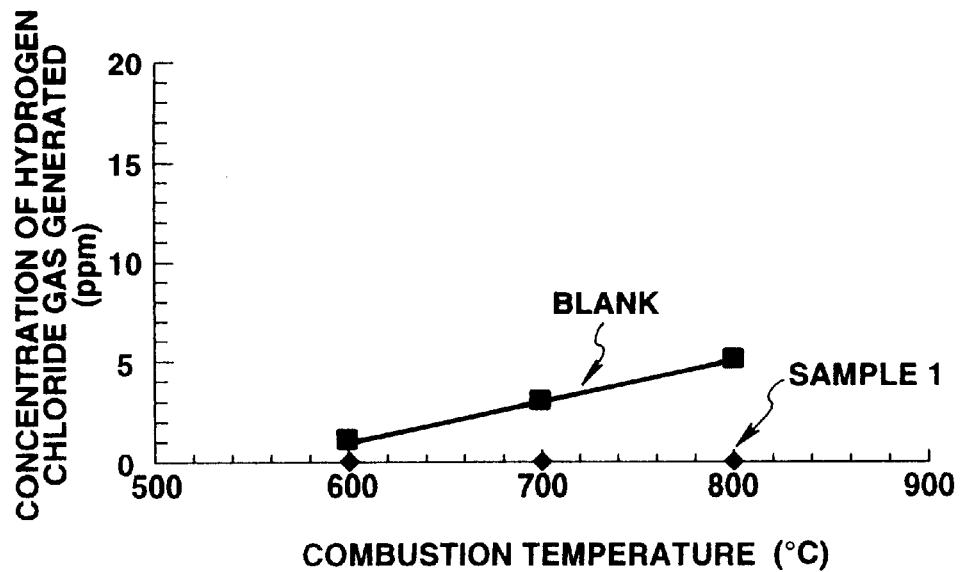
FIG. 3 is a graph showing hydrogen chloride gas concentration of using Sample 1 and blank thereof.

Further, FIG. 3 shows results of the analysis of the hydrogen chloride gas concentrations from the Sample 1 and the blank thereof. As a result of the analysis, it was determined that when the combustion temperature exceeded 600° C., hydrogen chloride gas was generated from the blank burned. Whereas, it was also determined that when the sample 1 was analyzed at combustion temperatures of 600° C., 700° C. and 800° C., no hydrogen chloride gas was generated from the sample 1 burned.

Figure 4:
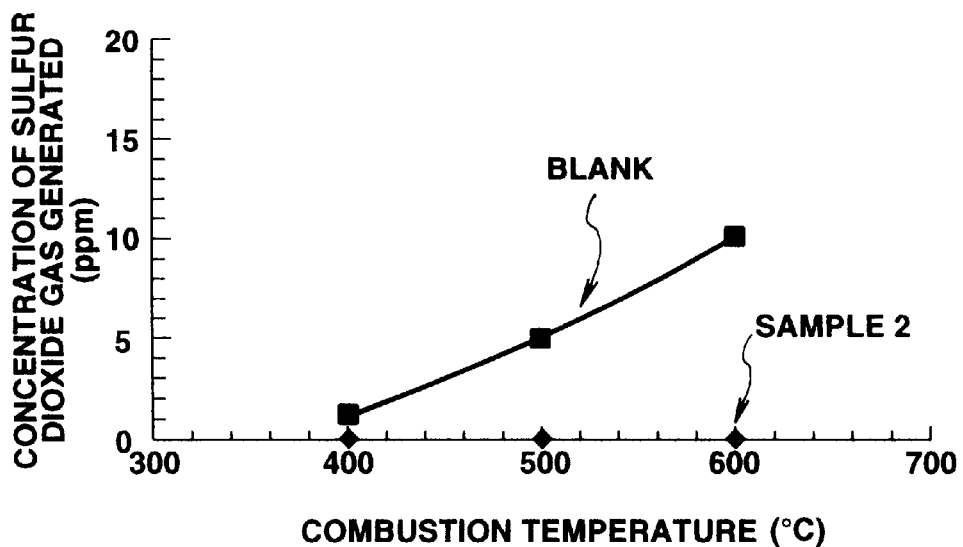
FIG. 4 is a graph showing sulfur dioxide gas concentration of using Sample 2 and blank thereof.

Further, FIG. 4 shows results of the analysis of the sulfur dioxide gas concentrations from the Sample 2 and the blank thereof. As a result of the analysis, it was determined that when the combustion temperature exceeded 400° C., sulfur dioxide gas was generated from the blank burned. Whereas, it was also determined that when the Sample 2 was analyzed at combustion temperatures of 400° C., 500° C., and 600° C., no sulfur dioxide gas was generated from the Sample 2 burned.

Figure 5:
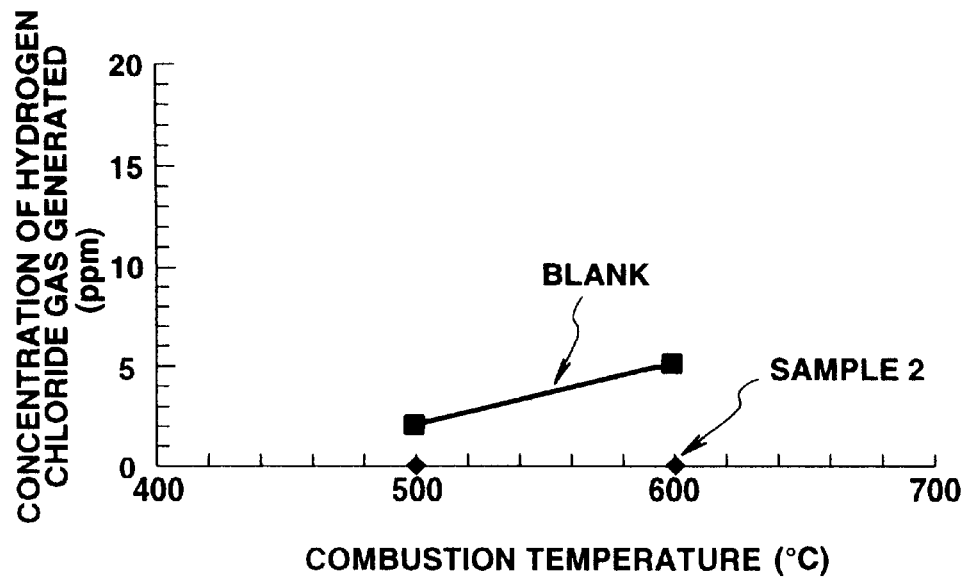
FIG. 5 is a graph showing hydrogen chloride gas concentration of using Sample 2 and blank thereof.

Further, FIG. 5 shows results of the analysis of the hydrogen chloride gas concentrations from the Sample 2 and the blank thereof. As a result of the analysis, it was determined that when the combustion temperature exceeded 500° C., hydrogen chloride gas was generated from the blank burned. Whereas, it was also determined that when the Sample 2 was analyzed at combustion temperatures of 500° C. and 600° C., no hydrogen chloride gas was generated from the Sample 2 burned.

What is claimed is:

1. A dust-removing synthetic resin filter comprising a filter material which comprises:

synthetic resin fibers; and spindle-shaped iron oxide particles showing a catalytic activity to hydrogen chloride gas or sulfur dioxide gas, and having a major axis diameter of 0.1 to 0.6 $\mu$m, a minor axis diameter of 0.02 to 0.05 $\mu$m, a BET specific surface area of 60 to 150 $m^2/g$ and an aspect ratio (major axis diameter/minor axis diameter) of 2:1 to 20:1.

2. A dust-removing synthetic resin filter according to claim 1, wherein said filter material comprises the synthetic resin fibers and the iron oxide particles attached onto the surface of the synthetic resin fiber.

3. A dust-removing synthetic resin filter according to claim 1, wherein said filter material comprises the synthetic resin fibers and the iron oxide particles incorporated within the synthetic resin fiber.

4. A dust-removing synthetic resin filter according to claim 1, wherein said filter material comprises a filter sheet of the synthetic resin fibers and the iron oxide particles attached onto the surface of said filter sheet.

5. A dust-removing synthetic resin filter according to claim 1, wherein said iron oxide particles are selected from the group consisting of iron oxide hydroxide particles, hematite particles, magnetite particles and maghemite particles.

6. A dust-removing synthetic resin filter according to claim 1, wherein the amount of said iron oxide particles is 1 to 20 g based on 1 $m^2$ of said filter material.

7. A dust-removing synthetic resin filter comprising a filter material which comprises a pair of filter sheets of synthetic resin fibers, and a material comprising synthetic resin fibers and spindle-shaped iron oxide particles incorporated within the synthetic resin fiber, or a material comprising a filter sheet of synthetic resin fibers and iron oxide particles attached onto the surface of the filter sheet, which material is sandwiched between the filter sheets, and which spindle-shaped iron oxide particles show a catalytic activity to hydrogen chloride gas or sulfur dioxide gas, and have a major axis diameter of 0.1 to 0.6 $\mu$m, a minor axis diameter of 0.02 to 0.05 $\mu$m, a BET specific surface area of 60 to 150 $m^2/g$ and an aspect ratio (major axis diameter/minor axis diameter) of 2:1 to 20:1.

8. A dust-removing synthetic resin filter comprising a filter material which comprises a filter sheet of synthetic resin fibers, spindle-shaped iron oxide particles attached onto the surface of the filter sheet, and a filter sheet of synthetic resin fibers laminated on the iron oxide particles attached on the filter sheet, which spindle-shaped iron oxide particles show a catalytic activity to hydrogen chloride gas or sulfur dioxide gas, and have a major axis diameter of 0.1 to 0.6 $\mu$m, a minor axis diameter of 0.02 to 0.05 $\mu$m, BET specific surface area of 60 to 150 $m^2/g$ and an aspect ratio (major axis diameter/minor axis diameter) of 2:1 to 20:1.

* * * * *